United States Patent
Agarwal et al.

(10) Patent No.: US 11,777,919 B2
(45) Date of Patent: *Oct. 3, 2023

(54) CERTIFICATE BASED EXPIRATION OF FILE SYSTEM OBJECTS

(71) Applicant: Red Hat, Inc., Raleigh, NC (US)

(72) Inventors: Vivek ShivBhagwan Agarwal, Bangalore (IN); Nagaprasad Sathyanarayana, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/991,526

(22) Filed: Aug. 12, 2020

(65) Prior Publication Data

US 2020/0374279 A1 Nov. 26, 2020

Related U.S. Application Data (63) Continuation of application No. 15/040,111, filed on Feb. 10, 2016, now Pat. No. 10,791,109.

(51) Int. Cl.
*G06F 16/11* (2019.01)
*H04L 9/40* (2022.01)
*H04L 9/32* (2006.01)

(52) U.S. Cl.
CPC ........ *H04L 63/0823* (2013.01); *G06F 16/125* (2019.01); *H04L 9/3268* (2013.01); *H04L 9/3297* (2013.01)

(58) Field of Classification Search
CPC . H04L 63/0823; H04L 9/3268; H04L 9/3297; G06F 16/125
USPC ....................................................... 707/689
See application file for complete search history.

(56) References Cited

U.S. PATENT DOCUMENTS

| | | | | |
|---|---|---|---|---|
| 6,216,231 B1 * | 4/2001 | Stubblebine | ............ | G06F 21/33 726/10 |
| 6,256,741 B1 * | 7/2001 | Stubblebine | ............ | G06F 21/33 713/150 |
| 6,367,013 B1 * | 4/2002 | Bisbee | ................... | G06Q 20/02 713/176 |
| 6,792,536 B1 * | 9/2004 | Teppler | ................... | G06F 21/64 726/32 |

(Continued)

FOREIGN PATENT DOCUMENTS

WO     2012167392 A2     12/2012

OTHER PUBLICATIONS

"Expire Files in a Folder: Delete Files After x Days", http://serverfault.com/questions/598133/expire-files-in-a-folder-delete-files-after-x-days, Dec. 8, 2015, 4 pages.

(Continued)

*Primary Examiner* — Hanh B Thai
(74) *Attorney, Agent, or Firm* — Lowenstein Sandler LLP (57) ABSTRACT

Systems and methods for enhancing file systems with file system objects that automatically expire. An example method may involve: scanning, by a processing device, a data storage node, wherein the data storage node comprises multiple certificates associated with file system objects in a plurality of different data storage nodes; iterating through the multiple certificates to determine a set of certificates, wherein the set of certificates comprises certificates that are invalid; and initiating a deletion of the file system objects in the plurality of different storage nodes.

20 Claims, 7 Drawing Sheets

(56) References Cited

U.S. PATENT DOCUMENTS

| | | | |
|---|---|---|---|
| 6,952,737 | B1 | 10/2005 | Coates |
| 6,978,284 | B2 | 12/2005 | McBrearty et al. |
| 7,334,125 | B1 | 2/2008 | Pellacuru |
| 7,607,164 | B2 | 10/2009 | Vasishth |
| 7,660,992 | B2 * | 2/2010 | Higashiura ............ H04L 9/3268 713/176 |
| 7,680,830 | B1 | 3/2010 | Ohr et al. |
| 7,801,846 | B2 | 9/2010 | Devine |
| 7,822,208 | B2 * | 10/2010 | Calvez ................. H04L 9/3268 380/278 |
| 7,970,743 | B1 | 6/2011 | Kilday |
| 8,060,619 | B1 | 11/2011 | Saulpaugh |
| 8,065,518 | B1 | 11/2011 | Henry |
| 8,095,516 | B2 | 1/2012 | Margolus |
| 8,281,087 | B2 * | 10/2012 | Stuart ................... G06F 16/122 711/134 |
| 8,380,676 | B1 | 2/2013 | Eastham et al. |
| 8,527,457 | B2 | 9/2013 | Moon |
| 8,589,659 | B1 | 11/2013 | Shapiro |
| 8,694,649 | B1 | 4/2014 | Saulpaugh |
| 9,063,946 | B1 | 6/2015 | Barber |
| 9,634,834 | B1 * | 4/2017 | Pelton .................. H04L 9/3268 |
| 9,652,487 | B1 * | 5/2017 | Patiejunas ........... G06F 16/2365 |
| 9,870,413 | B1 | 1/2018 | Saulpaugh |
| 9,992,186 | B1 | 6/2018 | Drozd |
| 10,120,579 | B1 * | 11/2018 | Patiejunas ............... G06F 3/061 |
| 10,771,261 | B1 * | 9/2020 | Lazar .................. H04L 9/3268 |
| 2001/0002485 | A1 * | 5/2001 | Bisbee .................. H04L 9/3236 705/51 |
| 2003/0041110 | A1 | 2/2003 | Wenocur |
| 2003/0115143 | A1 | 6/2003 | Kahn |
| 2004/0068650 | A1 * | 4/2004 | Resnitzky ............ H04L 63/0823 713/169 |
| 2004/0250071 | A1 | 12/2004 | Higashiura |
| 2005/0055519 | A1 | 3/2005 | Stuart |
| 2005/0069136 | A1 * | 3/2005 | Thornton ................ H04L 63/20 380/277 |
| 2005/0071630 | A1 | 3/2005 | Thornton |
| 2005/0074124 | A1 | 4/2005 | Thornton |
| 2005/0076203 | A1 * | 4/2005 | Thornton .............. H04L 9/3263 713/156 |
| 2005/0076218 | A1 * | 4/2005 | Brown ............... G06Q 30/0239 705/14.34 |
| 2005/0223414 | A1 | 10/2005 | Kenrich |
| 2005/0246393 | A1 | 11/2005 | Coates |
| 2005/0273857 | A1 | 12/2005 | Freund |
| 2006/0004868 | A1 | 1/2006 | Claudatos |
| 2006/0026220 | A1 | 2/2006 | Margolus |
| 2006/0112299 | A1 | 5/2006 | Urmston |
| 2006/0129849 | A1 | 6/2006 | Abgrall |
| 2006/0282629 | A1 | 12/2006 | Stuart |
| 2008/0155691 | A1 * | 6/2008 | Fossen .................. H04L 63/145 726/22 |
| 2008/0163338 | A1 * | 7/2008 | Micali .................... G07C 9/257 726/2 |
| 2008/0301439 | A1 | 12/2008 | Hashimoto |
| 2009/0119354 | A1 | 5/2009 | Stuart |
| 2009/0119469 | A1 | 5/2009 | Dellantoni et al. |
| 2009/0241104 | A1 | 9/2009 | Amiga |
| 2009/0327707 | A1 * | 12/2009 | Calvez ................. H04L 9/0836 380/45 |
| 2010/0257578 | A1 | 10/2010 | Shukla |
| 2010/0287249 | A1 | 11/2010 | Yigang |
| 2010/0306283 | A1 | 12/2010 | Johnson et al. |
| 2011/0320817 | A1 | 12/2011 | Miyazawa |
| 2012/0123999 | A1 | 5/2012 | Ashutosh |
| 2012/0151213 | A1 | 6/2012 | Xiao |
| 2013/0097122 | A1 | 4/2013 | Liem |
| 2013/0110919 | A1 | 5/2013 | An |
| 2013/0268740 | A1 | 10/2013 | Holt |
| 2013/0276089 | A1 * | 10/2013 | Tseitlin .................. H04L 41/12 707/E17.046 |
| 2013/0290704 | A1 | 10/2013 | Giniger |
| 2014/0046909 | A1 * | 2/2014 | Patiejunas ......... G06F 16/24554 707/687 |
| 2014/0089278 | A1 | 3/2014 | Lovinger |
| 2014/0115251 | A1 | 4/2014 | Belluomini |
| 2014/0149740 | A1 | 5/2014 | Sato |
| 2014/0310278 | A1 | 10/2014 | D'Amato |
| 2015/0304422 | A1 | 10/2015 | Shapiro |
| 2015/0347454 | A1 | 12/2015 | Krishna |
| 2016/0117376 | A1 | 4/2016 | Ji |
| 2016/0182494 | A1 | 6/2016 | Lissounov |
| 2017/0099293 | A1 * | 4/2017 | Tan ..................... G06F 21/6218 |

OTHER PUBLICATIONS

White Paper, "EMC Data Domain Retention Lock Software", https://www.emc.com/collateral/hardware/white-papers/h10666-data-domain-retention-lock-wp.pdf, Apr. 2014, 21 pages.

SEFS—Self Expiring File System, "File system that expries files using an expire date", http://sourceforge.net/projects/sefs/, Feb. 12, 2013, 2 pages.

"Automatically delete files after they expire", http://programmers.stackexchange.com/questions/149824/automatically-delete-files-after-they-expire, May 23, 2012, 5 pages.

* cited by examiner

CERTIFICATE BASED EXPIRATION OF FILE SYSTEM OBJECTS

RELATED APPLICATIONS

The present application is a continuation of application Ser. No. 15/040,111, filed Feb. 10, 2016 entitled "Certificate Based Expiration of File System Objects," which is incorporated by reference herein.

TECHNICAL FIELD

The present disclosure generally relates to file systems for storing objects, and more specifically relates to a file system that uses certificates to identify and remove file system objects that have expired.

BACKGROUND

Modern computers include file systems to store and organize data. A computer may add data to the file system by creating files and directories. Some of the files created may be used for a duration of time and may subsequently remain unused for the life of the file system, which may waste storage resources. Although the file system may allow the file to be removed, there may not be a way for the file to be associated with an expiration date and a way for the file system to remove the file system objects based on the expiration date.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for a file system that associates file system objects with expiration times and may automatically remove file system objects after the expiration time has passed. Each file system object may be associated with a certificate that identifies the expiration time. The file system may associate the file system object with the certificate after, before, or during the creation of the file system object. The expiration time may be determined based on an expiration policy that may take into account attributes of the file system, file system object, owner or a combination thereof. The expiration time may identify a point in time in which the file system object may no longer be accessed, and when the expiration time lapses, the file system may automatically (e.g., without any user interaction) delete the file system object. Deleting the file system object may involve permanently removing the file system object from the file system or moving the file to a different location as may occur for archiving or quarantining purposes.

Deletion of the expired file system objects may occur when the file system objects are subsequently accessed or as part of reoccurring scan. In one example, the file system may check the certificate of a file system object each time the file system object is accessed. When the certificate is valid (e.g., not expired or revoked), the file system object may be accessed, and when the certificate is invalid, the file system object may be deleted. In another example, the file system may delete files by utilizing a reoccurring scan that identifies the file system objects that have expired. The file system scan may be triggered based on a schedule (e.g., midnight each day), a frequency duration (e.g., every 7 days), or an event (e.g., system restart or user request). Once initiated, the scan may access the file system objects to check the validity of the certificates or may receive a list of invalid certificates and subsequently delete the corresponding file system objects.

Systems and methods described herein include a file system with auto expiring file system objects. In traditional file systems, an object is created and persists until a user initiates the deletion of the object. In the traditional file system, the user often determines at the time of deletion whether the object should be removed and may undergo a manual action to remove it. An advantage of the technology disclosed herein is that an expiration time of an object may be provided when (e.g., before, during or after) an object is created and the object may be automatically removed (e.g., without user interaction) in view of the expiration time. Various aspects of the above referenced methods and systems are described in details herein below by way of examples, rather than by way of limitation.

Figure 1:
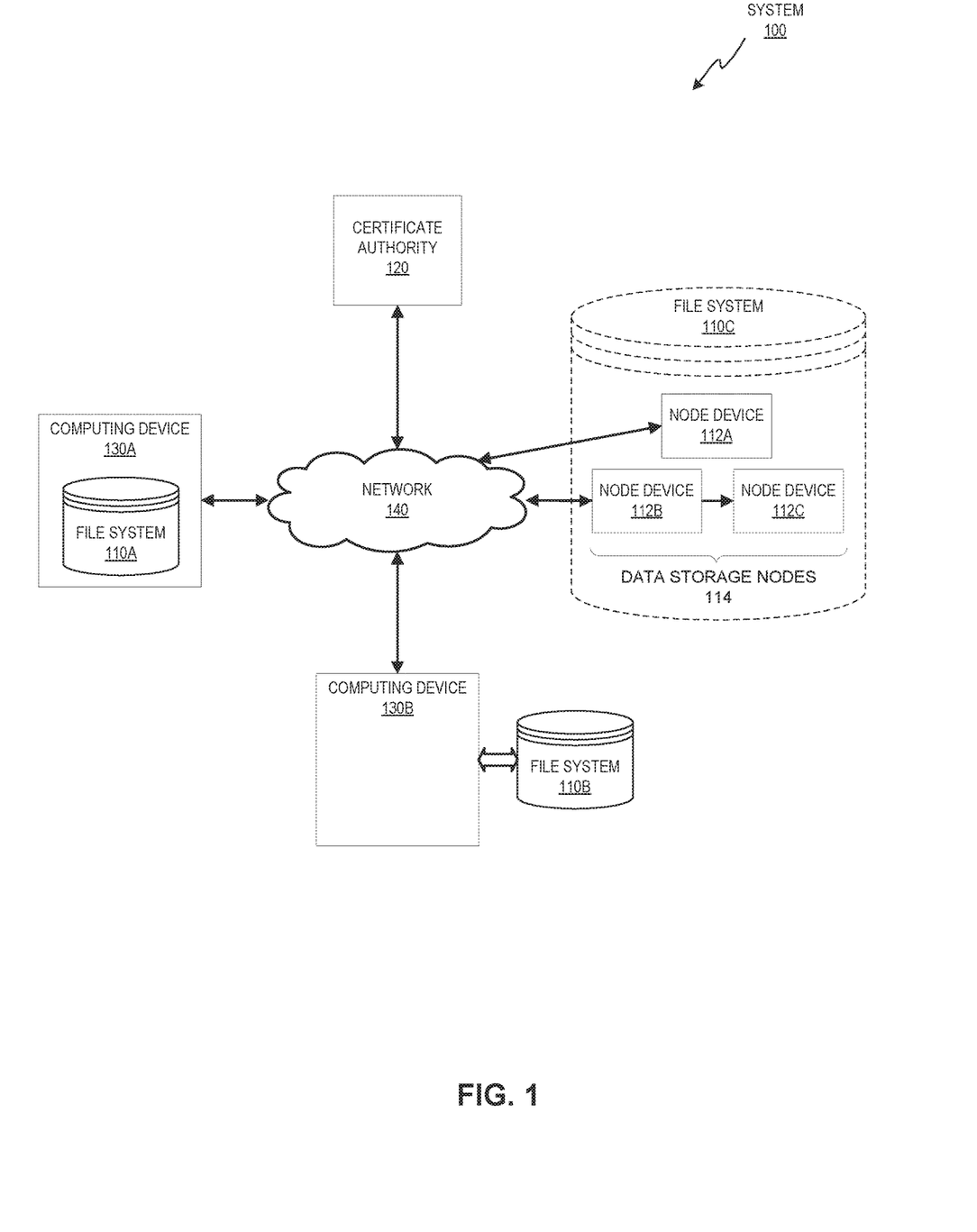
FIG. 1 depicts a high-level diagram of an example system architecture in accordance with one or more aspects of the present disclosure.

FIG. 1 illustrates an example system 100, in accordance with an implementation of the disclosure. The system 100 includes file systems 110A-C, a certificate authority 120, computing devices 130A and 130B and a network 140. Network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, and/or various combinations thereof.

File systems 110A-C may each include structures and rules for managing data and may utilize one or more data storage resources to store data. The data storage resources may include disk storage, tape storage, optical storage, flash storage, or other type of storage or combination thereof. The data may be arranged to form one or more file system objects. The file system objects may include files, directories, metadata and other information used by the file system to store, manage, or organize data. File systems 110A-C may be implemented as user space file systems, kernel based file systems or combination thereof. File systems 110A-C may store file system objects utilizing a centralized file system or a distributed file system or any other combination of file systems.

File system 110A and file system 110B may be local file systems that utilize data storage that may be directly attached to the computing device. Directly attached data storage may be storage that is accessible to a computing device without traversing a network connection. File system 110A may include data storage internal to computing device 130A and file system 110B may include data storage that is external to a computing device 130B. File systems 110A and 110B may include a structure that has both the metadata (e.g., i-nodes) and data of a file stored on the same storage device or may store the metadata on one storage device and the corresponding data on a different storage device. File system 110A and 110B may be the same or similar to a Unix File System (UFS), a Global File System (GFS), a New Technology Files System (NTFS), a Hierarchical File System (HFS), a Zettabyte File System, an Extended File System (EFS) or other file system or variation. File system 110A and 110B may be accessed by computing devices 130A and 130B using a communication channel, which may be the same or similar to Fibre Channel, Small Computer System Interface (SCSI), Universal Serial Bus (USB), Thunderbolt, Enhanced Integrated Drive Electronics (EIDE) or other interface technology.

File system 110C may be a distributed file system that may span multiple computing devices and may be accessed by computing device 130A and 130B by traversing one or more networks. The distributed file system may include multiple data storage nodes 114 that may function together to create, store, and remove file system objects. File system 110C may have decentralized file system management, centralized file system management or a combination of both (e.g., hierarchical). A decentralized file system management may include a file system that has more than one node managing the data storage activities of data storage nodes 114. A centralized file system management may include a distributed file system where one of the nodes manages the data storage activities of some or all of the other nodes. File system 110C may also have a partially centralized and partially decentralized management. For example, there may be an arrangement that includes multiple nodes arranged in a hierarchical arrangement (e.g., tree or star storage topology) such that a top-level node manages mid-level nodes and the mid-level nodes manage lower-level nodes. A simplified hierarchical arrangement is illustrated in FIG. 1 in regards to node devices 112A-C.

Node devices 112A-C may be any type of computing device that is capable of participating in a distributed file system, such as, client devices, server devices, data storage devices or other computing devices and may be stationary devices or mobile devices. Node devices 112A-C may contribute data storage resources, data processing resources or a combination thereof. In one example, each node device 112A-C may provide data storage resources and data processing resources for file system 110C. In another example, one or more of the node devices 112A-C may provide data processing resources to manage other node devices without providing data storage resources to store the file system objects of file system 110C.

Computing devices 130A-B may include client devices and server devices that communicate with one or more file systems 110A-C to add and remove file system objects. Each of the computing devices 130A and 130B may be able to access each of the files systems 110A-C via either direct or indirect communication (e.g., network access). Computing devices 130A and 130B may initiate requests to access, create, or delete file system objects and file systems 110A-C may receive and process the requests. Processing the requests may involve contacting a certificate authority 120 to generate or validate a certificate that may include information associated with the file system object (e.g., expiration time).

Certificate authority 120 may issue and validate certificates and may be a public or private certificate authority. A public certificate authority 120 may provide certificate related services to devices over the internet and may be the same or similar to the services provided by Symantec®, Comodo®, GoDaddy®, GlobalSign®, DigiCert® or other entity. A private certificate authority may provide certificate related services to devices associated with a specific organization (e.g., corporation or other business entity) or a group of related organizations (e.g., partners, subsidiaries). The private certificate authority may be a trusted device within the network of an organization and may provide services only to devices associated with the organization.

Certificate authority 120 may provide certificates and certificate related information using a proprietary or standardized certificate protocol. The certificate information may indicate whether the certificate is valid or invalid (e.g., expired, revoked, unknown). The certificate protocol may be the same or similar to an Online Certificate Status Protocol (OCSP), a Certificate Revocation Lists (CRL) or other certificate protocol and may or may not include a cryptographic mechanism. In one example, certificate authority may be a domain server or may implement a Lightweight Directory Access Protocol (LDAP) and may also function as a certificate server.

Figure 2:
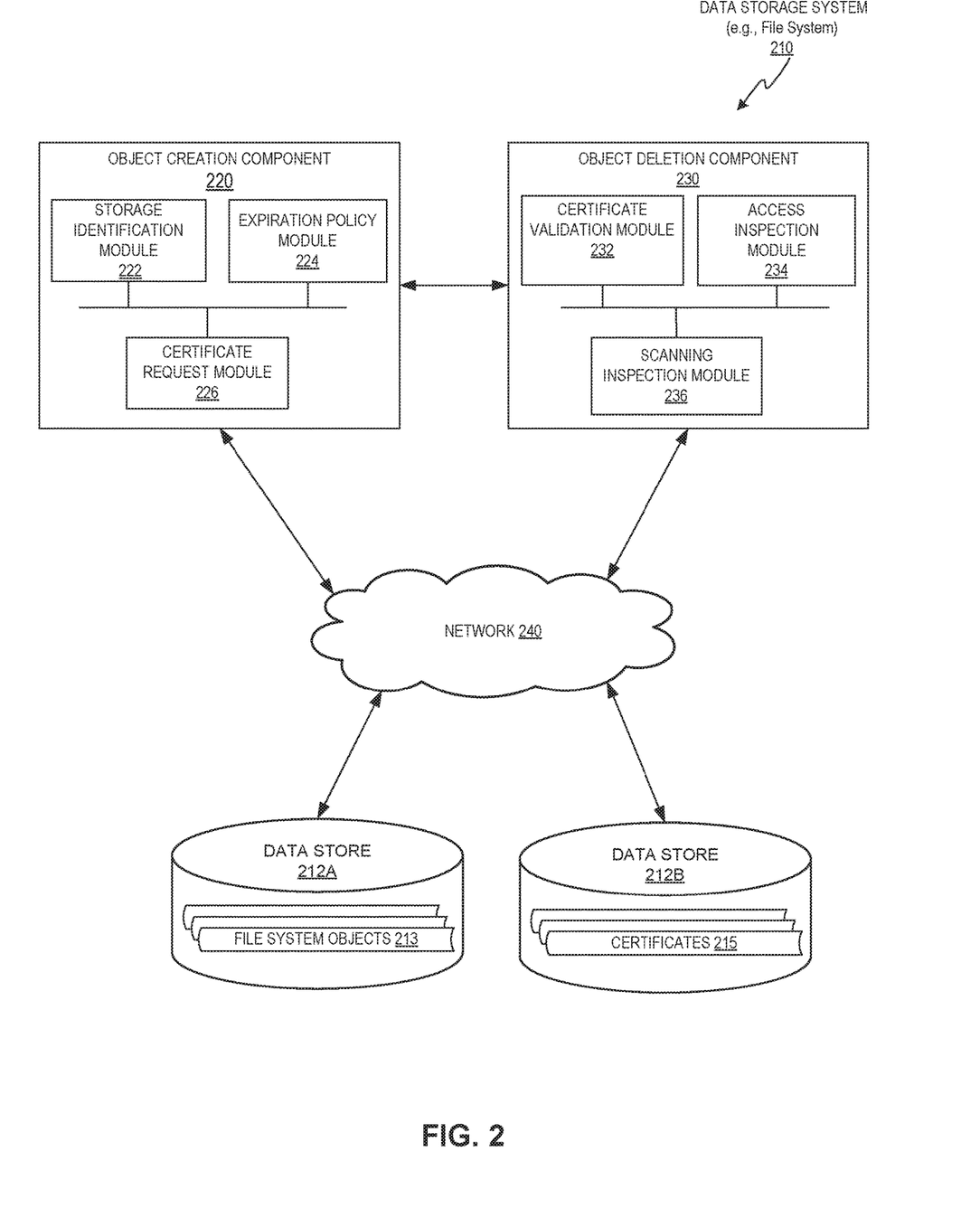
FIG. 2 depicts a high-level diagram of an example data storage system in accordance with one or more aspects of the present disclosure.

FIG. 2 depicts a block diagram of an exemplary data storage system 210 for providing file system functionality. Data storage system 210 may be the same or similar to computing device 130A, computing device 130B or include one or more node devices 112A-C of FIG. 1. Data storage system 210 may include one or more data stores 212A and 212B, an object creation component 220 and an object deletion component 230 that reside on one or more of computing devices 130A, 130B or node devices 112A-C of FIG. 1.

Data stores 212A and 212B may include one or more data storage resources and may be used to store file system objects 213 and certificates 215. Data stores 212A and 212B may include disk storage, tape storage, optical storage, flash storage, or other type of storage or a combination thereof. Data stores 212A and 212B may be different data stores on different devices (e.g., as shown) or may be on the same device. Alternatively, data stores 212A and 212B may be combined into single data store.

File system objects 213 may include file objects, directory objects, metadata and other information used by the file system to store, manage, or organize data. A file object may be a data structure that organizes data and identifies portions (e.g., locations) of a data store that stores the corresponding data. Each file may be associated with one or more attributes such as file access information or user information. The attributes may include or relate to file names, file ownership, creation time, permissions (e.g., read, write execute), file type or other attributes. A directory object may be a data structure for cataloging one or more files and directories (e.g., subdirectories). Directories may be the same or similar to folders or catalogs and may be arranged in a hierarchical manner such that there are parent directories and child directories. A directory data structure may include a reference pointer to one or more files and one or more directories and may include the same or similar attributes as those discussed above with respect to files. Actions performed on a directory may be propagated to one or more of the underlying files and directories. For example, performing a delete action on an expired directory may delete the directory and may iterate through files and subdirectories within the directory.

Each of the file system objects 213 may be linked with one of the corresponding certificates 215. File system objects 213 and certificates 215 may be a bi-directionally linked or uni-directionally linked. A bidirectional link may link a file system object with the corresponding certificate and also link the certificate with the corresponding file system object. This may be advantageous because it may enable a system to identify the certificate when a component (e.g., object deletion component 230) knows the file system object or identify the file system object when the component (e.g., object deletion component 230) knows the certificate. A unidirectional link may link the file system object with the certificate or the certificate with the file system object but not both.

Certificates 215 may be associated with one or more file system objects 213. In one embodiment, each of certificates 215 may correspond to an individual file system object, such that each file object and each directory object is associated with one and only one certificate. In another embodiment, each certificate 215 may correspond to one or more file system objects. In the latter embodiment, one of the certificates 215 may be associated with a group of files, a group of directories or a combination thereof. The group of file system objects may have been created at the same time or within a predefined duration of time (e.g., within one or more seconds, minutes or hours).

Certificates 215 may include information related to file system objects and may include expiration time data, identifier data, location data, creation time of the file system object or certificate, data within the file system object (e.g., file content) or a combination thereof. The expiration time data may include one or more date/times that may correspond to expiration times of the certificates, expiration times of the file system objects, or both. The identifier data of the certificate may include an identifier, such as a unique identifier (e.g., UUID, GUID), that identifies the file system object and is able to distinguish the file system object from other objects (e.g., all other objects) within the file system. The identifier may also or alternatively include a name such as a file name or directory name. The location data of the certificate may identify the logical location or the physical location of the data associated with a file system object. The location data may be a hierarchical location and may include a directory path associated with the file system object. The directory path may be an absolute path from a root directory or a relative path, such as a path to the file system object from the location of the certificate. The certificate may also include a portion of one or more of the file system objects 213. For example, the certificate may include a hash (e.g., MD5, SHA2) of the content of a file and may be used for authenticity or integrity verification purposes.

Data storage system 210 may include an object creation component 220 that may handle tasks associated with creating new file system objects 213. Object creation component 220 may receive requests to create file system objects from a computing device and may initiate the creation of the file system object. Object creation component 220 may include a storage identification module 222, an expiration policy module 224, and a certificate request module 226.

Storage identification module 222 may identify available resources that can accommodate a new file system object (e.g., one or more nodes 114 to store a new file or a new directory). Storage identification module 222 may analyze the request to determine the storage resources required and identify the location of available resources. The file system may be a co-located file system (e.g., local file system) or a distributed file system so the available resources may be local or remote to the device executing the object creation component 220.

Expiration policy module 224 may evaluate one or more expiration policies to determine expiration data for file system objects 213. Expiration policy module 224 may determine the expiration data based on attributes of the file system objects. For example, the expiration policy module 224 may assess the data within a file system object (e.g., text, binary, image), the location of the file system object (e.g., temporary directory) and the owner of the file system object to determine an expiration time. The expiration time may be a specific time (e.g., epoch time that evaluates to Dec. 31, 2015 @ 12:00) or a relative time (e.g., 30 days in future). An expiration policy may be associated with a specific type of file system object (e.g., text, binary, image) and may specify expiration time data for the specific type of file system object. The expiration time data may differ based on a file system object owner, a file system object location, etc. The expiration time associated with the file system object may be set any time before, during or after the creation of the certificate or the creation of the file system object or a combination thereof. For example, at (or after) creation time of the file system object the certificate request module 226 may send a certificate request (e.g., certificate signing request) and data about file object to certificate authority 120. The certificate authority 120 may then determine the expiration time or may receive user input (e.g., administrator input) to set the expiration time and may subsequently issue the certificate.

Certificate request module 226 may be integrated with expiration policy module 224 and may form certificate requests and transmit the certificate requests to certificate authority 120. Forming certificate requests may involve gathering information related to a file system object such as file system object attribute data, user data and device data. The certificate request may be transmitted before, during, or after a file system object is created on data store 212A. For example, the certificate request may be transmitted after the request to create the file was received but prior to allocating space on data store 212A.

Data storage system 210 may also include an object deletion component 230 that may handle tasks associated with deleting file system objects 213. Object deletion component 230 may check the validity of certificates and delete file system objects that are associated with invalid certificates. Object deletion component 230 may include a certificate validation module 232, an access inspection module 234, and a scanning inspection module 236.

Certificate validation module 232 may identify certificates associated with a file system object and may determine whether the certificate is valid. The validity of a certificate may be based on whether the certificate is expired, revoked, mismatched, or unknown. As discussed above, the certificate may be associated with an expiration time and if the expiration time is less than (e.g., prior to) the current time, then the certificate is considered expired and is therefore invalid. The certificate may also be invalid if it has been revoked, which may occur if a user or device signals the certificate authority to revoke the certificate. A mismatched certificate is a certificate that has data that does not align with the corresponding file system object. For example, the certificate may include a hash of the file system object and if the hash within the certificate does not align (e.g., match) with the hash of the corresponding file system object the certificate and file system object are misaligned and the certificate may be considered invalid. An unknown certificate may be a certificate that is not known by the certificate authority and may indicate the certificate is a counterfeit certificate.

Access inspection module 234 may inspect certificates when file system objects are accessed and may initiate the deletion of the file system objects when the certificates are invalid. Access inspection module 234 may determine when or how often to inspect the validity of a certificate associated with a file system object. In one example, access inspection module 234 may check the validity of the certificate every time the file system object is accessed. In another example, certificate validation module 232 may check the certificate less often, such as once every 10, 100, 1000 accesses. Checking the certificate less often may be advantageous because the overhead of checking the certificate may adversely affect the performance of the file system.

In further examples, there may be an inspection policy that is used to determine certificate inspection frequencies. There may be different certificate inspection frequencies for different file system objects within the file system. The certificate inspection frequency may be based on attributes of the file system, file system object, creator or other attributes. The inspection frequency may be inversely related to the quantity or rate of file system object access requests or the duration of time that has elapsed since the last access request or certificate inspection. The certificate inspection frequencies may vary from checking every time a file system object is accessed to never requiring a check when the files system object is accessed. In the latter situation, expired file system objects may be removed by scanning inspection module 236.

Scanning inspection module 236 may scan data storage device 210 (e.g., file system) or a portion of the device to identify file system objects that may be removed. The scanning inspection may be triggered in view of a schedule (e.g., midnight each day), a frequency duration (e.g., once a week), or an event (e.g., system restart or user request). A scanning inspection may check the validity of certificates 215 to determine which file system objects 213 can be deleted. Scanning inspection module 236 may check certificates individually or may receive a list of invalid certificates from a certificate server or certificate authority 120. Determining which file system objects can be deleted may be done with or without accessing the file system object itself. For example, scanning inspection module 236 may check the validity of one or more certificates on data store 212B to identify which file system objects may be removed from data store 212A. Scanning inspection module may delete the file system objects with or without accessing the file system object (e.g., de-referencing the data storage location).

Figure 3:
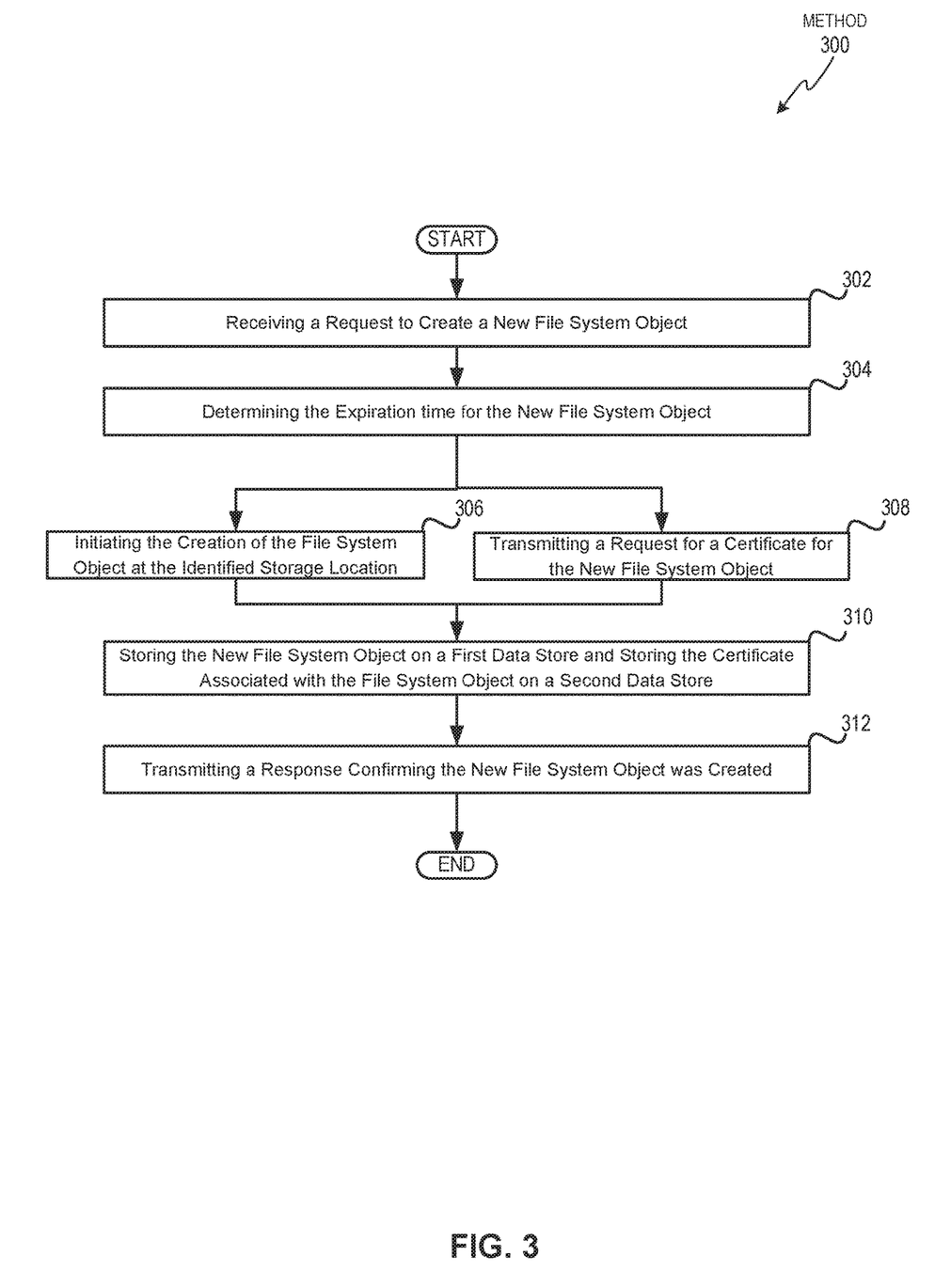
FIG. 3 depicts a flow diagram of an example method for creating a new file system object and associating the files system object with an expiration time in accordance with one or more aspects of the present disclosure.

FIG. 3 depicts a flow diagram of one illustrative example of a method 300 for creating a new file system object. The methods discussed below may be performed by processing device that may comprise hardware (e.g., circuitry, dedicated logic), software (such as is run on a general purpose computer system or a dedicated machine), or a combination of both. The methods and each of their individual functions, routines, subroutines, or operations may be performed by one or more processors of the computer device executing the method. The methods may be performed by processing device of a client device, a server device or a data storage device.

Method 300 may begin at block 302, when the processing device receives a request to create a new file system object. As discussed above, the file system object may be a file or a directory. The request may be initiated in view of a user request and may be received from a local device or may be received over a network from a remote device.

At block 304, the processing device may determine, in response to the request, the expiration time for the new file system object. The expiration time may be determined in view of an expiration time policy that may be configured by a product designer, IT administrator or end user. The expiration policy may include one or more rules for determining the expiration time (e.g., date/time) and may take into account the user requesting the file, the location of the file, the type of the file or other related information.

At block 306, the processing device may initiate the creation of the file system object at a storage location identified by storage identification module 222. The storage location may be associated with a local or remote storage resource.

At block 308, the processing device may transmit a request for a certificate for the new file system object. The request may include the expiration time and the storage location as well as other information related to the user, processing device or file system object. The request may be transmitted to certificate authority 120 automatically (without a user request to do so) and in one example the request may be a certificate signing request sent to a private certificate authority hosted within an intranet of a corporation.

At block 310, the processing device may store the new file system object on a first data store (e.g., data store 212A) and the certificate associated with the file system object on a second data store (e.g., data store 212B). The first and second data stores may be located on different computing devices and the first data store may be a part of the file system and the second data store may be associated with a certificate storage server that is remote from the file system.

At block 312, the processing device may transmit a response confirming the new file system object was created. The response may be transmitted to a client device that requested the creation of the file system object and may include information (e.g., expiration time) about the file system object. In response to completing the operations of block 312, the method may terminate.

Figure 4:
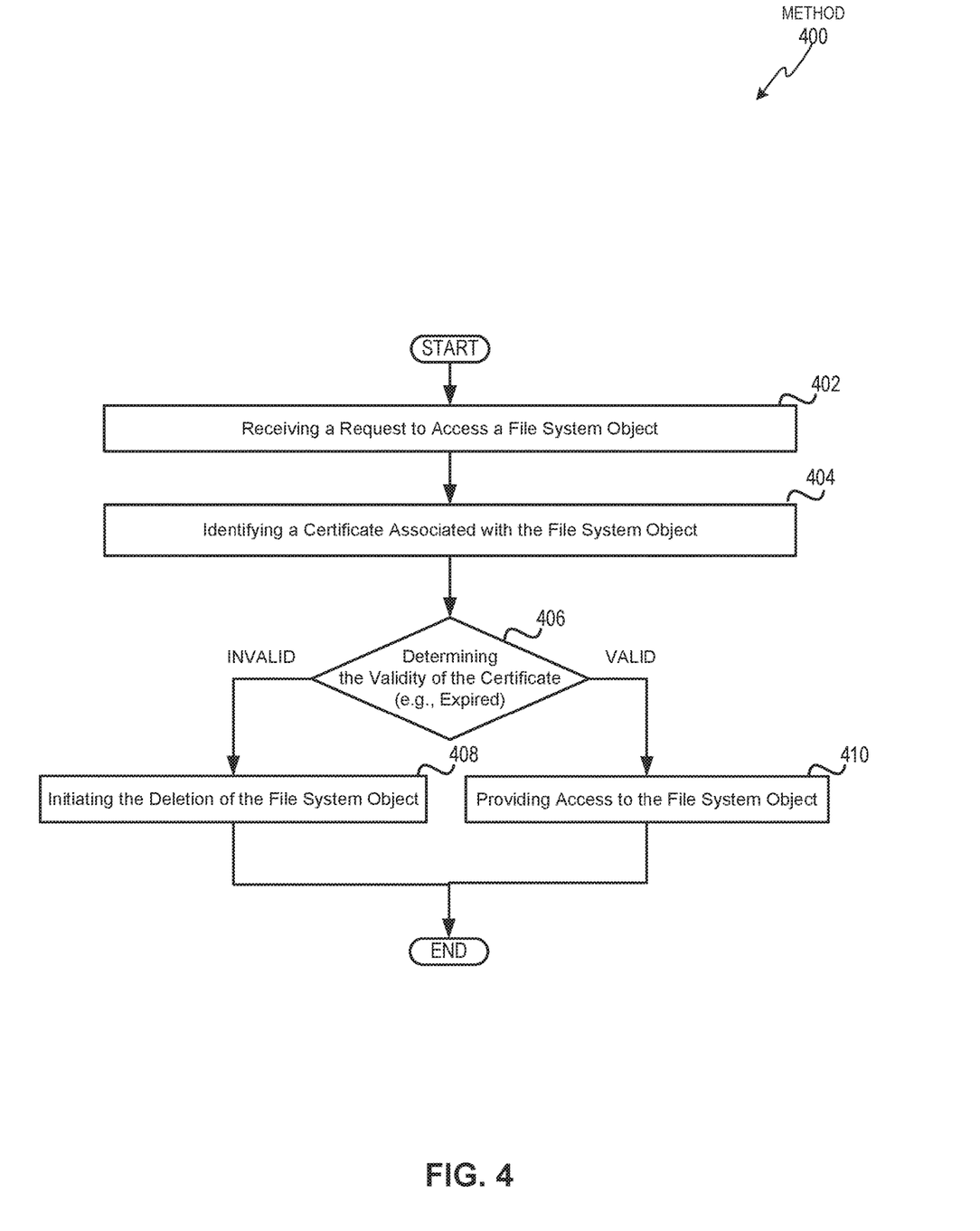
FIG. 4 depicts a flow diagram of another example method for deleting a file system object when the files system object is accessed after the expiration time in accordance with one or more aspects of the present disclosure.

FIG. 4 depicts a flow diagram of one illustrative example of a method 400 for deleting file system objects. Method 400 may be performed by processing device of a client device, a server device or a data storage device and may begin at block 402.

At block 402, the processing device may receive a request to access a file system object. The access may be related to reading, writing, executing or other access of a file system object. The request may identify the file system object, the user, the device requesting access or a combination thereof.

At block 404, the processing device may identify, in the response to the above request, a certificate associated with the file system object associated with the request. In one example, identifying the certificate may involve accessing an attribute of the file system object that identifies the certificate. In another example, identifying the certificate may involve searching a data store using identification data of the file system object as a search key.

At block 406, the processing device may determine the validity of the certificate. Determining the validity of the certificate may involve contacting a certificate authority to validate the certificate. A certificate may be invalid if it is expired, revoked, misaligned, or unknown. As discussed above, the certificate may be associated with an expiration time and if the expiration of time is less than (e.g., prior to) the current time (e.g., epoch time), then the certificate is considered expired and is therefore invalid. The method may proceed to block 408 when the certificate is invalid and may proceed to block 410 when the certificate is valid.

At block 408, the processing device may automatically (e.g., without any use interaction) initiate the deletion of the file system object in response to determining the certificate is invalid (e.g., expired). Deletion of the file system object may involve permanently removing the file system object from the file system or moving the file to a different location as may occur for archiving or quarantining purposes. In one example, the processing device may initiate the deletion and also delete the file system object. In another example, the processing device may initiate the deletion by sending a request to another device and the other device may delete the file system object.

At block 410, the processing device may provide access to the file system object in response to determining the certificate is valid. In response to providing access to the file system object, method 400 may terminate.

Figure 5:
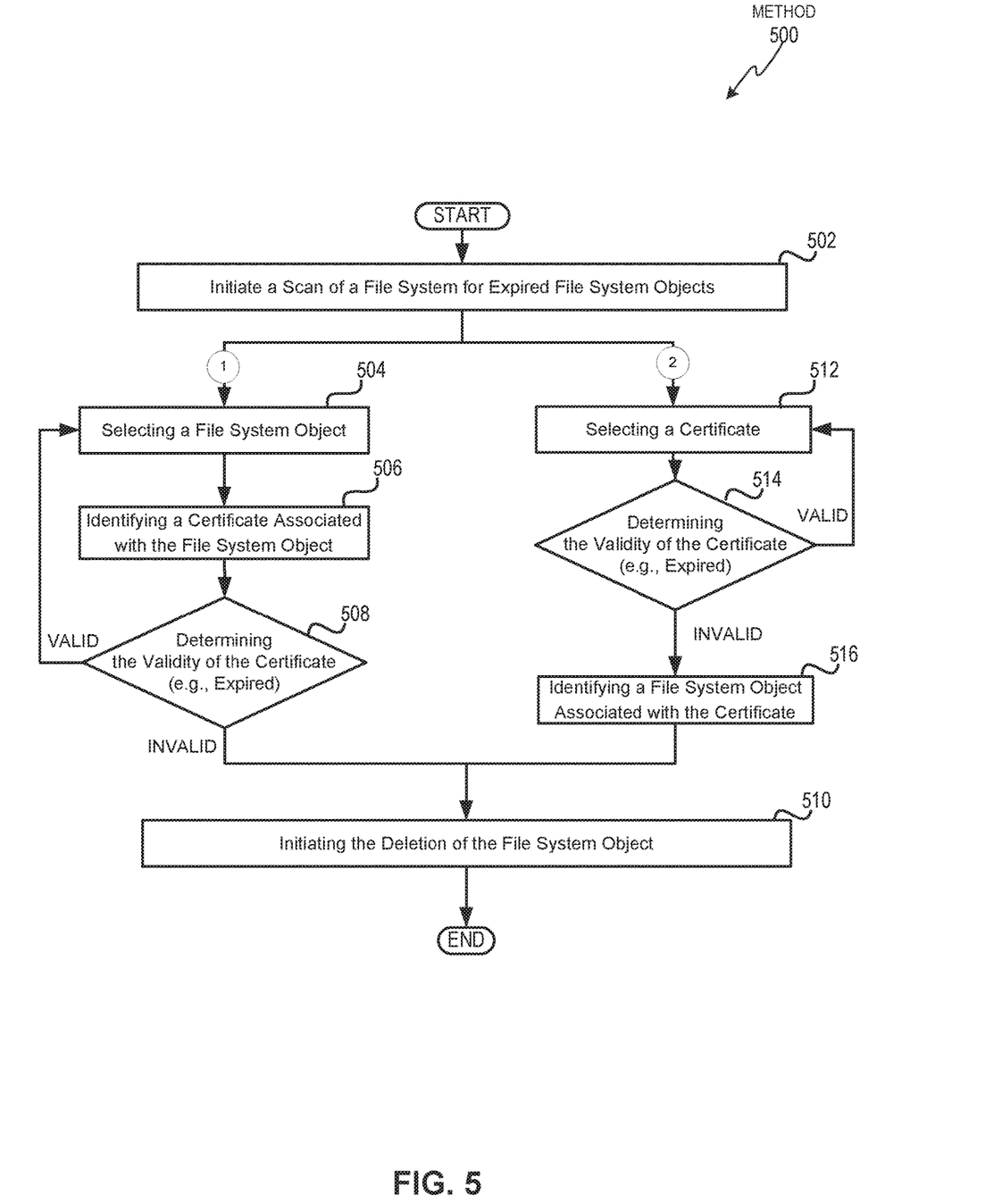
FIG. 5 depicts a flow diagram of an example method for scanning the file system to delete file system objects that have expired in accordance with one or more aspects of the present disclosure.

FIG. 5 depicts a flow diagram of one illustrative example of a method 500 for scanning a file system to identify and delete file system object that are expired. Method 500 may be performed by processing device of a client device, a server device or a data storage device and may begin at block 502.

At block 502, the processing device may initiate a scan of a file system to identify expired file system objects. The scan may be initiated or triggered based on a schedule (e.g., midnight each day), a frequency and duration (e.g., twice a week), or an event (e.g., system restart, user request). Once initiated, the scan may identify expired file system objects by scanning the file system object or scanning the certificates or a combination of both. When the method is configured to scan the file system objects, it may proceed along the path labeled "1" to block 504. When the method is configured to scan the certificates, it may proceed along the path labeled "2" to block 512.

At block 504, the processing device may select a file system object from the multiple file system objects stored in the file system. The method for selecting a file system object may involve sorting the file system objects based on an attribute and iterating through the file system objects.

Blocks 506 and 508 may be the same or similar to blocks 404 and 406 and may involve the processing device identifying a certificate associated with the file system object and determining the validity of the certificate. When the certificate is valid, the method may branch back to block 504 to select another file system object, and when the certificate is invalid, the method may proceed to block 510.

At block 510, the processing device may initiate the deletion of the file system object in a manner similar to block 408. Deletion of the file system object may involve permanently removing the file system object from the file system or moving the file to a different location as may occur for archiving or quarantining purposes.

At block 512, the processing device may begin proceeding along the path labeled "2" and may select a certificate from multiple certificates associated with the file system. The method for selecting a certificate may involve sorting the certificates based on an attribute (e.g., expiration time) and iterating through the certificates or querying for a list of certificates that have expired or are about to expire in a given period.

At block 514, the processing device may determine the validity of the certificates. When the certificate is valid the method may branch back to block 512 to select another certificate. When the certificate is invalid the method may proceed to block 516.

At block 516, the processing device may identify a file system object associated with the invalid certificate. Identifying the file system object may involve analyzing the information within the certificate. In one example, the certificate may include file system object identification information or file system object location information that may be used to identify the file system object.

Once the file system object has been identified, the method may proceed to block 510, discussed above, to initiate the deletion of the file system object. In response to completing the operations associated with block 510 the method may terminate.

In other examples, method 500 may utilize a list of expired certificates to identify which file system objects have expired. For example, the processing device may transmit a request for an expired certificate list or may periodically receive the list from a certificate server without explicitly requesting the list. The processing device may identify a file system object associated with each entry in the certificate list and then initiate the deletion of the file system objects. The deletion may occur as individual deletion requests or as a single request that identifies multiple file system objects.

Figure 6:
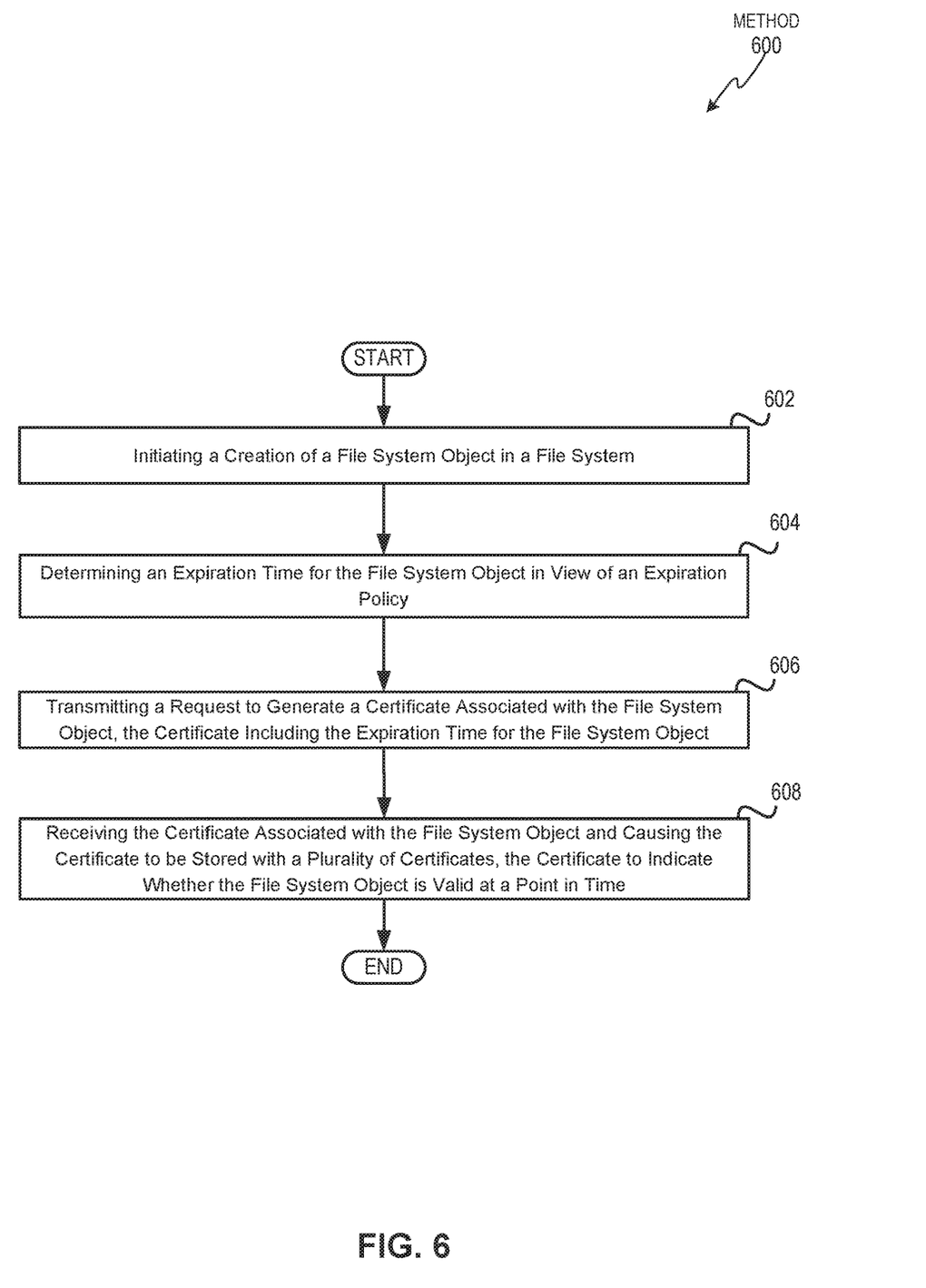
FIG. 6 depicts a flow diagram of an example method for creating and deleting file system objects in accordance with one or more aspects of the present disclosure.

FIG. 6 depicts a flow diagram of one illustrative example of a method 600 for creating a file system object in a file system. Method 600 may be performed by processing device of a client device, a server device or a data storage device and may begin at block 602.

At block 602, the processing device may initiate a creation of a file system object in a file system. In one example, initiating the creation of the file system object may involve selecting a remote storage node from a plurality of storage nodes associated with a distributed file system and sending a request over a network to an intermediate storage node to create the file system object on the remote storage node.

At block 604, the processing device may determine an expiration time for the file system object in view of an expiration policy. The expiration policy may include one or more rules for identifying a time based on attributes of the files system, file system object, creator or other data. In one example, the expiration policy module 224 may assess the data within a file system object (e.g., text, binary, image), the location of the file system object (e.g., temporary directory) and the owner of the file system object to determine an expiration time. The expiration time may be a specific time (e.g., epoch time that evaluates to Dec. 31, 2015 @ 12:00) or a relative time (e.g., 30 days in future).

At block 606, the processing device may transmit a request to generate a certificate associated with the file system object. The request may identify the expiration time, and transmitting the request to create a certificate associated with the file system object may involve transmitting a certificate signing request over a network to at least one of a public certificate authority or a private certificate authority.

At block 608, the processing device may receive the certificate associated with the file system object and may cause the certificate to be stored with a plurality of certificates. The certificate may indicate whether the file system object is valid at a point in time and some or all of the plurality of certificates may be associated with file system objects that are within the file system or have been previously deleted. In one example, the certificate may be stored with a plurality of certificates on a device separate from the storage device storing file system objects. In another example, the certificate may be stored on the same storage device that stores the corresponding file system object. The certificate may include information identifying the expiration time and may include at least one of an identifier of the file system object, a path of the file system object, or a hash of the file system object.

In another example of method 600, the processing device may inspect the certificate to determine whether the file system object has expired. The inspection may involve checking the validity of the certificate and may occur in response to receiving a request to access a file system object or may occur as a result of a file system scan operation or may be a combination of both. Inspecting the validity of the certificate upon access may occur at different frequencies. In one example, the file system may inspect the certificate each time access to the file system object is requested. In another example, the file system may inspect the validity of the certificate occasionally based on a checking frequency (e.g., certificate inspection frequency). Determining the checking frequency may involve identifying an access rate for the file system object, which may indicate the number of times the files system object was accessed during a period of time and determining in view of the access rate how often to check a validity of the certificate associated with the file system object. When the access rate exceeds a threshold rate, the file system object may be accessed without checking the validity of the certificate. In this latter situation, an expired file system object may be removed during a subsequent scan operation.

In a further example the processing device may inspect the validity of the certificate during a file system scan operation. A file system scan operation may involve scanning the file system to identify multiple file system objects and determining certificates corresponding to the plurality of file system objects are invalid. In an alternate example, the processing device may receive a message with the plurality of invalid certificates.

In another example of method 600, the processing device may delete the file system object corresponding to the certificate in response to determining the certificate is invalid. The processing device may determine the certificate associated with the file system object is invalid when a current time exceeds the expiration time.

Figure 7:
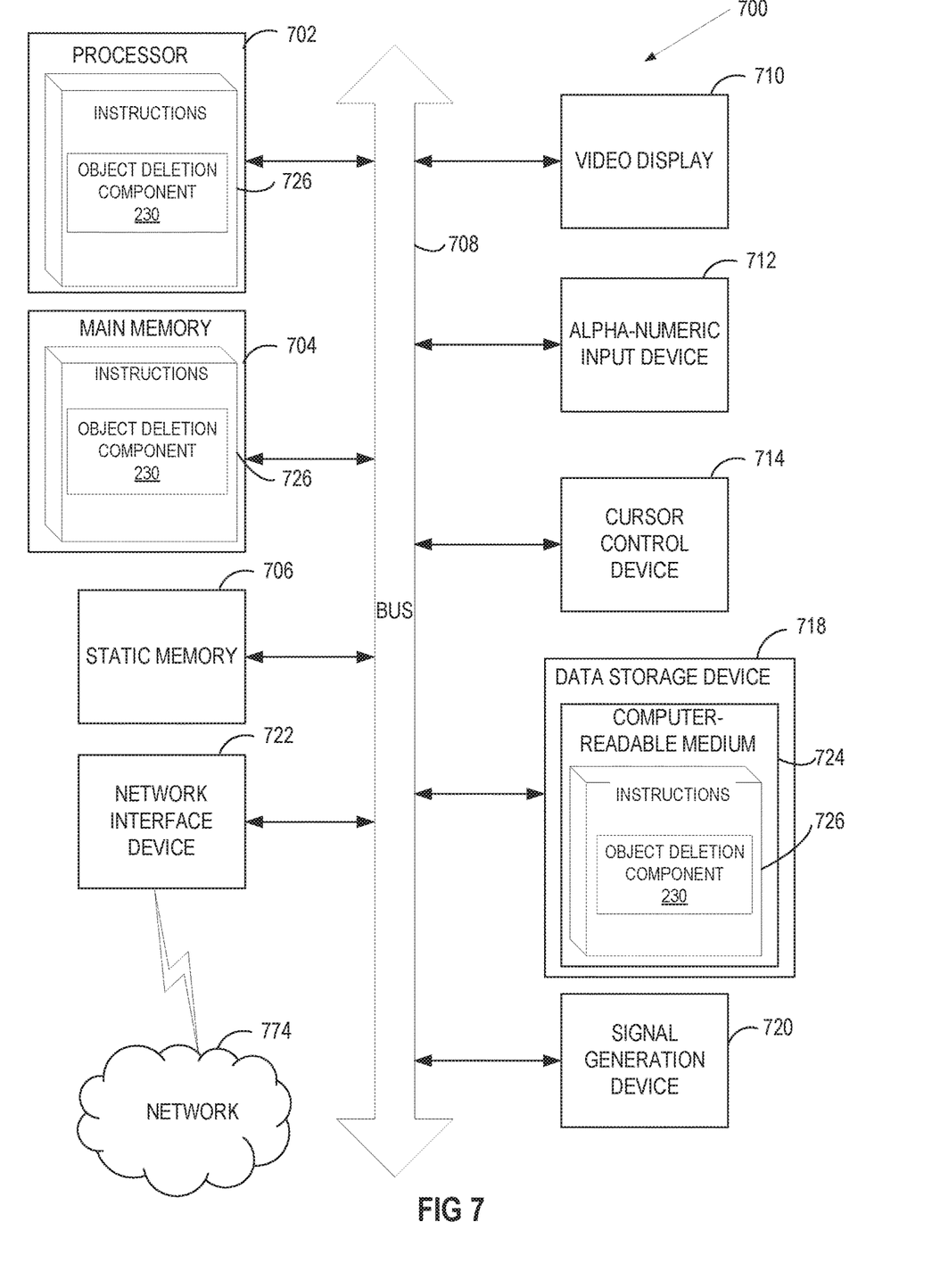
FIG. 7 depicts a block diagram of a computer system operating in accordance with one or more aspects of the present disclosure.

FIG. 7 depicts a block diagram of a computer system operating in accordance with one or more aspects of the present disclosure. In various illustrative examples, computer system 700 may correspond to example system architecture 100 of FIG. 1.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processor 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processor 702 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions encoding object creation component 220 (not shown) or object deletion component 230 of FIG. 2 implementing methods 300, 400, 500 or 600.

Instructions 726 may also reside, completely or partially, within volatile memory 704 and/or within processor 702 during execution thereof by computer system 700, hence, volatile memory 704 and processor 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "initiating", "determining", "creating", "transmitting", "inspecting", "deleting", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   transmitting, by a processing device, a request to create a certificate, the certificate being associated with a file system object and indicating an expiration time of the file system object, wherein the file system object is stored on a first data storage device and the certificate is stored on a second data storage device;
   scanning, by the processing device, the second data storage device, wherein the second data storage device comprises multiple certificates associated with file system objects stored on a plurality of data storage devices, wherein each certificate of the multiple certificates indicates an expiration time for at least one of the file system objects;
   iterating, by the processing device, based on an attribute of each certificate, through the multiple certificates to identify a set of certificates, wherein the set of certificates comprises invalid certificates; and
   responsive to identifying the set of certificates, deleting, on the plurality of data storage devices, file system objects associated with the invalid certificates in the set, by permanently removing the associated file system objects from respective locations of the associated file system objects.

2. The method of claim 1, further comprising:
   initiating, by the processing device, a creation of a file system object of the file system objects in the first data storage device of the plurality of data storage devices;
   determining, by the processing device, the expiration time for the file system object in view of an expiration policy; and
   upon receiving the certificate associated with the file system object, causing the certificate to be stored with the multiple certificates in the second data storage device that is different from the first data storage device, wherein the certificate is to indicate whether the file system object is valid at a point in time.

3. The method of claim 2, further comprising:
   receiving a request to access the file system object;
   determining the certificate associated with the file system object is valid in response to a current time preceding the expiration time of the certificate; and
   providing access to the file system object in response to determining the certificate is valid.

4. The method of claim 2, wherein the certificate associated with the file system object further comprises at least one of an identifier of the file system object, a path of the file system object, or a hash of the file system object.

5. The method of claim 2, further comprising scanning a plurality of file system objects, and deleting a subset of the plurality of file system objects in response to determining that certificates corresponding to the subset of the plurality of file system objects are invalid.

6. The method of claim 1, further comprising determining additional certificates are invalid in response to receiving a message identifying the additional certificates as invalid certificates, and wherein deleting further comprises running an operation to delete each file system object associated with the additional certificates from the plurality of data storage devices.

7. The method of claim 2, further comprising checking a validity status of the certificate each time access to the file system object is requested.

8. The method of claim 2, further comprising:
   identifying an access rate for the file system object, the access rate indicating a number of times the files system object was accessed during a period of time; and
   determining in view of the access rate how often to inspect a validity of the certificate associated with the file system object, wherein in response to the access rate exceeding a threshold rate the file system object may be accessed without inspecting the validity of the certificate.

9. The method of claim 2, wherein transmitting the request to create a certificate associated with the file system object comprises transmitting a certificate signing request over a network to at least one of a public certificate authority or a private certificate authority.

10. The method of claim 2, wherein the certificate is stored with the multiple certificates on a device separate from a storage device storing the file system object.

11. The method of claim 2, wherein initiating the creation of the file system object comprises:
    selecting the first data storage device from a plurality of data storage devices associated with a distributed file system; and
    sending a request over a network to an intermediate data storage device that creates the file system object on the first data storage device.

12. A system comprising:
    a memory; and
    a processing device operatively coupled to the memory, the processing device to:
    transmit, a request to create a certificate, the certificate being associated with a file system object and indicating an expiration time of the file system object, wherein the file system object is stored on a first data storage device and the certificate is stored on a second data storage device;

scan the second data storage device, wherein the second data storage device comprises multiple certificates associated with file system objects stored on a plurality of data storage devices, wherein each certificate of the multiple certificates indicates an expiration time for at least one of the file system objects;

iterate, based on an attribute of each certificate, through the multiple certificates to identify a set of certificates, wherein the set of certificates comprises invalid certificates; and responsive to identifying the set of certificates, delete, on the plurality of data storage devices, file system objects associated with the invalid certificates in the set, by permanently removing the associated file system objects from respective locations of the associated file system objects.

13. The system of claim 12, wherein the processing device is further to:

initiate a creation of a file system object of the file system objects in the first data storage device of the plurality of data storage devices;

determine the expiration time for the file system object in view of an expiration policy; and upon receiving the certificate associated with the file system object, cause the certificate to be stored with the multiple certificates in the second data storage device that is different from the first data storage device, wherein the certificate is to indicate whether the file system object is valid at a point in time.

14. The system of claim 13, wherein the processing device further to:

receive a request to access the file system object;

determine the certificate associated with the file system object is valid in response to a current time preceding the expiration time of the certificate; and providing access to the file system object in response to determining the certificate is valid.

15. The system of claim 13, wherein the certificate associated with the file system object further comprises at least one of an identifier of the file system object, a path of the file system object, or a hash of the file system object.

16. The system of claim 13, wherein the processing device is further to scan a plurality of file system objects and delete a subset of the plurality of file system objects in response to determining that certificates corresponding to the subset of the plurality of file system objects are invalid.

17. A non-transitory machine-readable storage medium storing instructions that cause a processing device to:

transmit, a request to create a certificate, the certificate being associated with a file system object and indicating an expiration time of the file system object, wherein the file system object is stored on a first data storage device and the certificate is stored on a second data storage device;

receive a request to access a file system object of the first data storage device;

identify a certificate associated with the file system object, wherein the certificate indicates the expiration time for the file system object, the certificate being stored in the second data storage device that is different from the first data storage device;

determine that multiple certificates in the second data storage device are invalid, wherein the multiple certificates comprise the certificate and are associated with file system objects in a plurality of data storage devices; and responsive to determining that multiple certificates in the second data storage device are invalid, delete, on the plurality of data storage devices the file system objects associated with the invalid certificates, by permanently removing the file system objects from respective locations of the file system objects.

18. The non-transitory machine-readable storage medium of claim 17, wherein the instructions further cause the processing device to:

initiate a creation of a file system object of the file system objects in the first data storage device of the plurality of data storage devices;

determine the expiration time for the file system object in view of an expiration policy; and upon receiving the certificate associated with the file system object, cause the certificate to be stored with the multiple certificates in the second data storage device that is different from the first data storage device, wherein the certificate is to indicate whether the file system object is valid at a point in time.

19. The non-transitory machine-readable storage medium of claim 18, wherein the processing device is further to determine the certificate associated with the file system object is valid in response to a current time preceding an expiration time of the certificate.

20. The non-transitory machine-readable storage medium of claim 18, wherein the certificate associated with the file system object further comprises at least one of an identifier of the file system object, a path of the file system object, or a hash of content of the file system object.

* * * * *